(12) United States Patent
Takahashi et al.

(10) Patent No.: US 6,585,010 B2
(45) Date of Patent: Jul. 1, 2003

(54) PRECISION FINE POWDER DISPERSING SUPPLY APPARATUS

(75) Inventors: Kiyoshi Takahashi, Saitama-ken (JP); Shuji Shinkai, Saitama-ken (JP); Junichiro Hisazumi, Saitama-ken (JP); Hiromitsu Suzuki, Tokyo (JP); Hiroshi Murata, Tokyo (JP)

(73) Assignee: Nisshin Engineering Inc., Tokyo (JP)

( * ) Notice: Subject to any disclaimer, the term of this patent is extended or adjusted under 35 U.S.C. 154(b) by 0 days.

(21) Appl. No.: 09/738,768

(22) Filed: Dec. 18, 2000

(65) Prior Publication Data

US 2001/0004908 A1 Jun. 28, 2001

(30) Foreign Application Priority Data

Dec. 21, 1999 (JP) .............................. 11-362223
Mar. 14, 2000 (JP) ........................... 2000-069866

(51) Int. Cl.[7] .............................. B65B 1/20; B65B 1/28; B65B 3/18; B65B 3/22
(52) U.S. Cl. ............................. 141/82; 141/67; 141/83; 141/129; 141/144
(58) Field of Search .............................. 141/83, 82, 67, 141/93, 121, 129, 144, 94; 239/133, 135

(56) References Cited

U.S. PATENT DOCUMENTS

| | | | | |
|---|---|---|---|---|
| 3,677,471 A | * | 7/1972 | Deakin | 239/133 |
| 3,958,758 A | * | 5/1976 | Piorkowski | 118/302 |
| 4,407,108 A | * | 10/1983 | Craig | 53/451 |
| 5,332,133 A | | 7/1994 | Murata et al. | |
| 5,765,607 A | * | 6/1998 | Ansaloni | 141/135 |
| 5,826,633 A | * | 10/1998 | Parks et al. | 141/18 |
| 5,875,824 A | * | 3/1999 | Atwell et al. | 141/67 |

FOREIGN PATENT DOCUMENTS

JP      5238544      9/1993

* cited by examiner

Primary Examiner—Timothy L. Maust

(57) ABSTRACT

A precision fine powder dispersing supply apparatus includes a fine powder storage vessel, a minute amount supply feeder, a supply device for supplying fine powder in the storage vessel to the minute amount supply feeder, and a discharging device for discharging the fine powder from the minute amount supply feeder to the subsequent process. It is preferable to dispose a heat unit to the transportation path of the fine powder discharged from the minute amount supply feeder. Further, it is preferable to dispose fine particle sensors to the minute amount supply feeder to confirm the feed operation of the fine powder. With this arrangement, the precision fine powder dispersing supply apparatus can stably supply the fine powder in a dispersed state in an ultra minute amount with pinpoint accuracy.

17 Claims, 9 Drawing Sheets

FIG.7

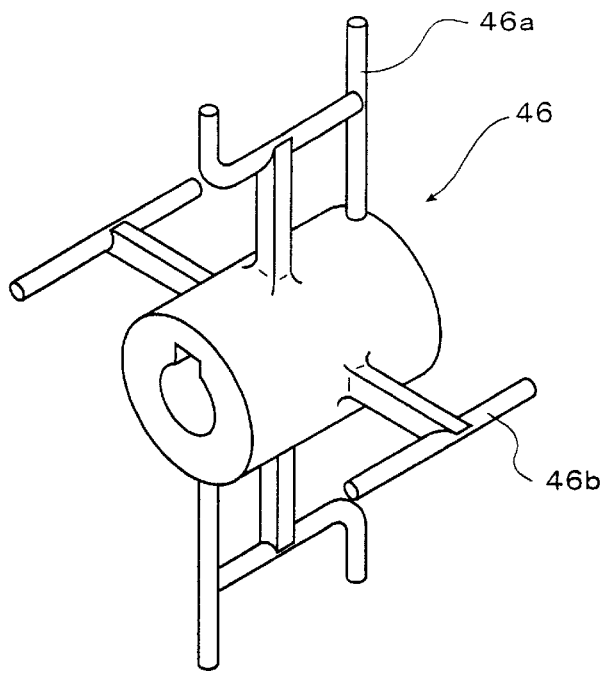

FIG.8A

▽
↓
| OPEN LUBRICANT SUPPLY VALVE TO TABLET MAKING MACHINE |
↓
| OPEN HIGH PRESSURE AIR SUPPLY VALVE TO MINUTE AMOUNT SUPPLY FEEDER |
↓
△

FIG.8B

▽
↓
| CLOSE LUBRICANT SUPPLY VALVE TO TABLET MAKING MACHINE |
↓
| CLOSE HIGH PRESSURE AIR SUPPLY VALVE TO MINUTE AMOUNT SUPPLY FEEDER |
↓
| OPEN EXHAUST VALVE OF LUBRICANT SUPPLY FEEDER |
↓
| CLOSE EXHAUST VALVE OF LUBRICANT SUPPLY FEEDER AFTER PRESSURE IS REDUCED |
↓
△

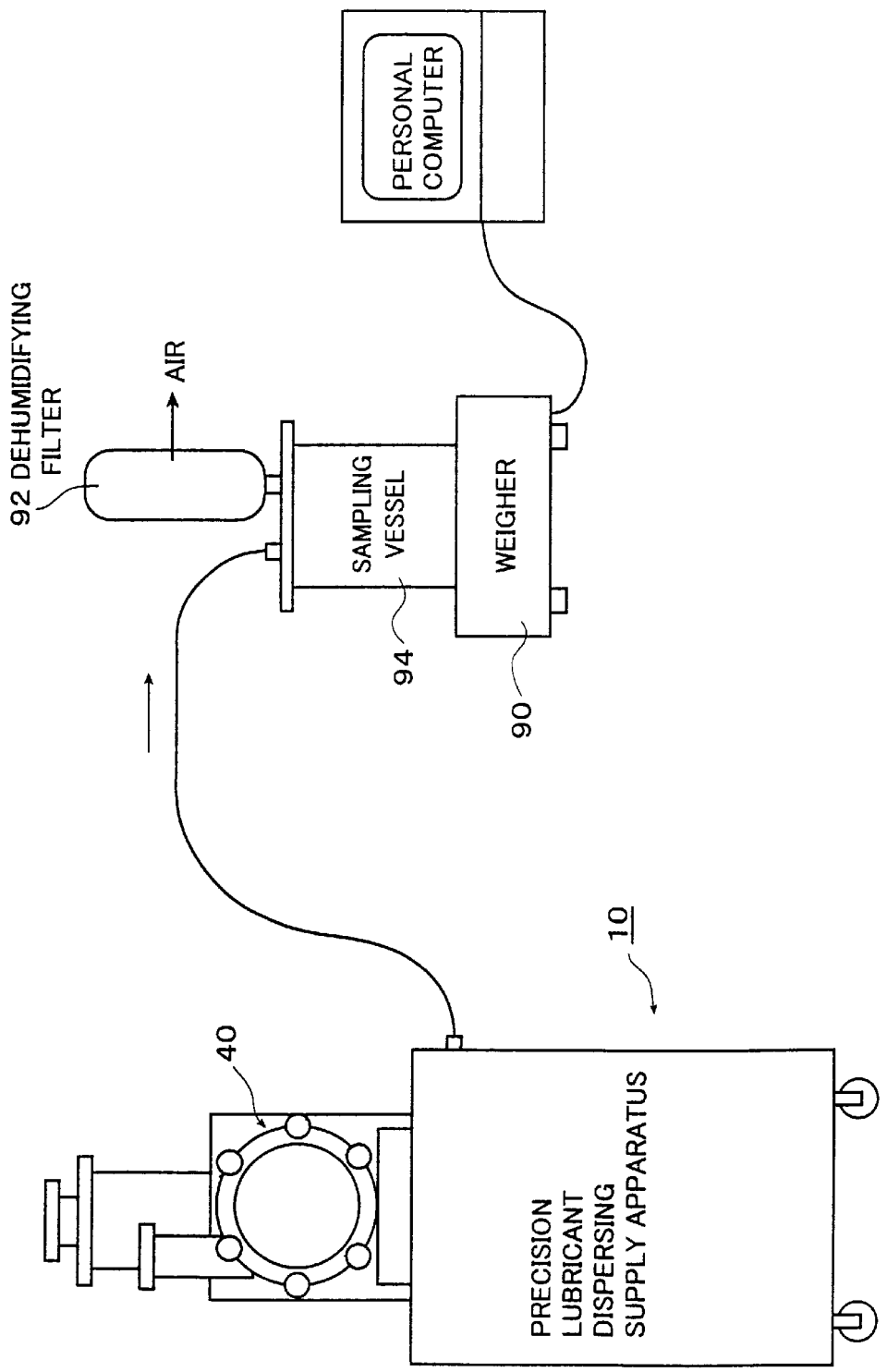

CHANGE OF WEIGHT OF MAGNESIUM STEARATE

US 6,585,010 B2

PRECISION FINE POWDER DISPERSING SUPPLY APPARATUS

BACKGROUND OF THE INVENTION

The present invention relates to a precision fine powder dispersing supply apparatus, and more particularly, for example, to a precision fine powder dispersing supply apparatus capable of stably supplying a lubricant to a tablet making machine in a dispersed state in a very minute amount which is not substantially varied with time or the variation of which with time is strictly suppressed.

Hitherto, apparatuses for stably supplying inorganic and organic powder having a very small particle size such as metal, ceramic, plastic and the like in a very minute amount in a state that the variation with time of an amount of it to be supplied is very strictly suppressed in respective technical fields of, for example, plasma thermal spraying, spacer spraying apparatuses for liquid crystal substrates, powder compression and formation, sand blast apparatuses, powder coating and the like.

In relation to this field of technology, the apparatus proposed by the applicant in Japanese Unexamined Patent Application Publication No. 5-238544 titled "Powder Supply Apparatus" also is widely used.

Incidentally, the above apparatus has a very excellent capability in that it can stably supply fine powder in a dispersed state in a very minute amount while very strictly suppressing the variation with time or the secular variation of the amount of it to be supplied. However, in the apparatus, it is not taken into consideration to use it continuously. Thus, the development of an improved powder supply apparatus capable of fitting this need requirement has not been realized.

SUMMARY OF THE INVENTION

An object of the present invention, which was made in view of the above circumstances, is to provide a precision fine powder dispersing supply apparatus having enhanced reliability by more improving the conventionally used powder supply apparatus filed previously such that powder, in particular, fine powder, which is very liable to be deposited on the wall of a vessel, a feed piping system, and the like, can be supplied smoothly for a long period of time in a precisely dispersed state with an additional function of checking how the powder to be supplied is fed or discharged.

In order to attain the object described above, the present invention provides a precision fine powder dispersing supply apparatus for supplying fine powder to a subsequent process in a dispersed state comprising a fine powder storage vessel, a minute amount supply feeder, a supply device for supplying fine powder in the storage vessel to the minute amount supply feeder, and a discharging device for discharging the fine powder from the minute amount supply feeder to the subsequent process.

It is preferable that the minute amount supply feeder comprises a rotary body having at least one circumferential groove which is filled with the fine powder and formed on an outer circumferential surface, at least one thin pipe disposed so that the opening thereof faces the at least one circumferential groove with a predetermined interval defined therebetween, at least one filling device for forcing and filling the fine powder into the at least one circumferential groove of the rotary body and a pressure difference generating device for generating a pressure difference for causing an air flow from a space in which the rotary body is disposed into the at least one thin pipe so that the fine powder that is forced into and filled in the at least one circumferential groove of the rotary body is discharged together with air.

It is also preferable that the pressure difference generating device is a pressurizing device for pressurizing the space in which the rotary body is disposed.

It is another preferable that the minute amount supply feeder includes fine powder presence sensing device disposed in front of and behind the at least one thin pipe to confirm whether or not the fine powder that is forced into and filled in the at least one circumferential groove of the rotary body exists therein and whether or not the fine powder is discharged therefrom.

It is further preferable that valves are disposed to respective ones of an exhaust path from an upper space of the storage vessel, a pressurized air supply path of the pressurizing device and the fine powder discharge path of the fine powder supply feeder as well as a control device is provided to open and close the valves when the apparatus is started and stopped.

It is still another preferable that a heat device is disposed in a transportation path of the fine powder from the fine powder supply feeder to the subsequent process.

It is still further preferable that at least the minute amount supply feeder is placed on a weigher so that a flow rate of the supplied fine powder can be continuously measured.

It is also further preferable that a plurality of circumferential grooves for filling the fine powder are formed as the at least one circumferential groove on the outer circumferential surface of the rotary body as well as a plurality of filling devices for forcing and filling the fine powder into the plurality of circumferential grooves and plurarilty of thin pipes having openings that face the plurality of circumferential grooves with a predetermined interval defined therebetween are disposed as the at least one filling device and the at least one thin pipe in correspondence to the plurality of circumferential grooves and a plurality of outlets of the plurality of thin pipes are disposed so as to correspond to a plurality of the subsequent processes.

BRIEF DESCRIPTION OF THE DRAWINGS

FIG. 7 is a view showing an arrangement of stirring blades of a stirring unit in FIG. 1;

FIGS. 8A and 8B are flowcharts explaining a sequence for opening and closing respective valves when the apparatus is started and stopped;

FIG. 9 is a view explaining a measurement device for measuring how accurately a lubricant is supplied by the lubricant supply apparatus according to an embodiment of the present invention.

FIG. 9.

FIG. 9.

DETAILED DESCRIPTION OF THE INVENTION

A precision fine powder dispersing supply apparatus of the present invention will be described below in detail referring to a preferred embodiment shown in the accompanying drawings. Note that the present invention will be described below as to the embodiment in which it is embodied as a precision lubricant dispersing supply apparatus.

Figure 1:
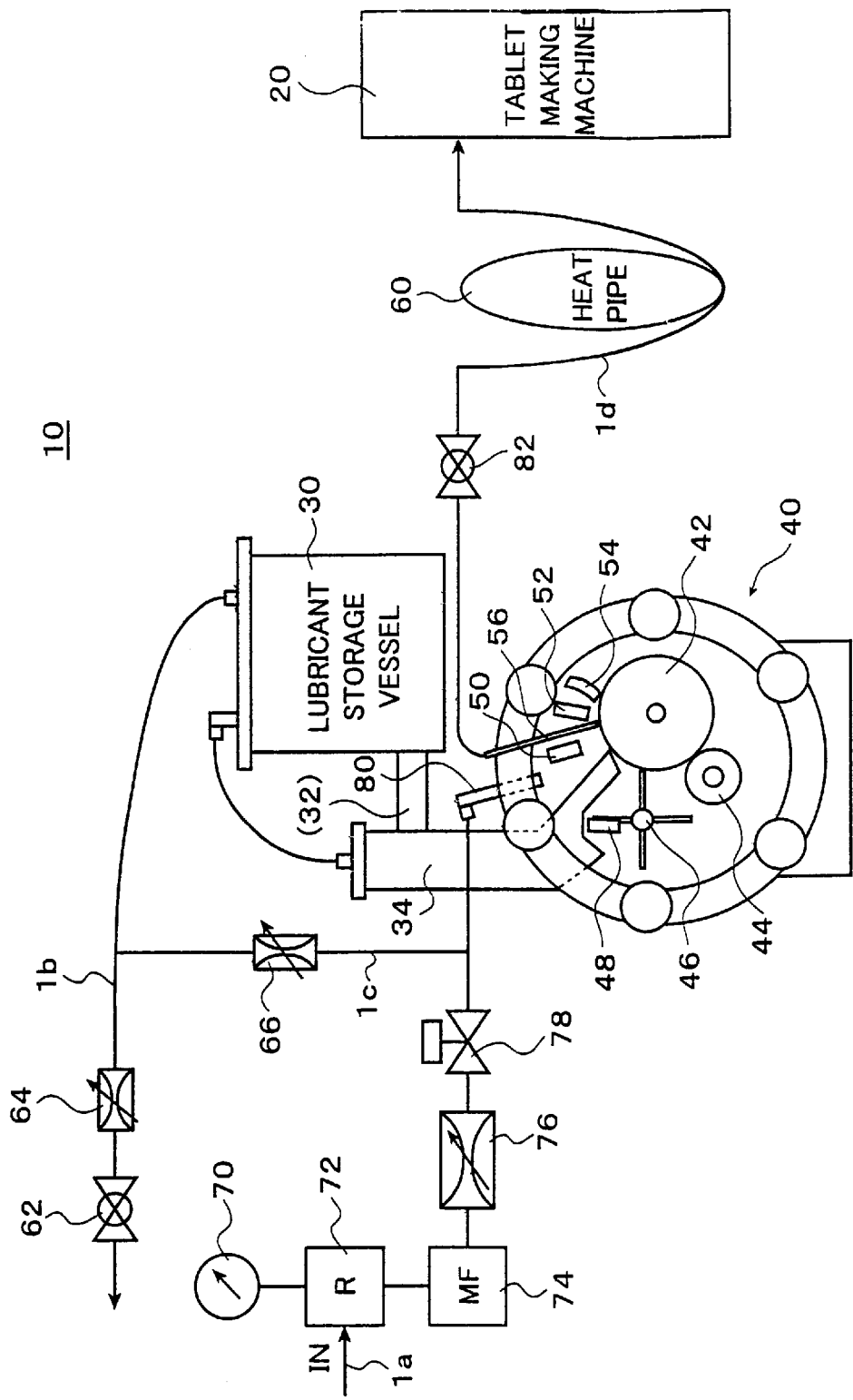
FIG. 1 is a block diagram showing an overall arrangement of a lubricant supply apparatus according to an embodiment of the present invention.

FIG. 1 is a block diagram showing an overall arrangement of the precision lubricant dispersing supply apparatus (hereinafter, abbreviated as "lubricant supply apparatus") according to the embodiment of present invention.

As shown in FIG. 1, the lubricant supply apparatus 10 shown in the embodiment is used to supply a lubricant to a tablet making machine 20 in a dispersed state. The lubricant supply apparatus 10 is mainly composed of a lubricant supply system, a minute amount supply feeder 40, and an air flow heat unit (heat pipe) 60. The lubricant supply system includes a lubricant storage vessel 30, a charge chute 34, and a screw feeder 32 for connecting them; the minute amount supply feeder 40 includes a rotary supply body 42 for the lubricant, which will be described later in detail, a lubricant filling roll 44 for forcing and filling a groove 42a on the rotary supply body 42 with lubricant powder, a stirring unit 46 in the lubricant storage vessel 30, and the like; and the air flow heat unit 60 is disposed in a lubricant discharge (feed) path from the minute amount supply feeder 40 to the above-mentioned table making machine 20. Here, the filling roll 44 can be called as a lubricant pressure charge roll or lubricant charge under pressure and fill roll for charging under pressure and filling the lubricant powder into the groove 42a.

Further, in FIG. 1, numerals 48, 50, and 52 denote optical sensors, which will be described later in detail, for sensing whether or not the lubricant is present, numeral 54 denotes a scraper of the minute amount supply feeder 40, which also will be described later, numeral 56 denotes a lubricant supply pipe for supplying the lubricant to the next process, numeral 62 denotes an exhaust ball valve for exhausting the interior of the apparatus after it is stopped, numerals 64 and 66 denote speed controllers for regulating the pressure (atmospheric pressure) in an air piping system which will be described later, numeral 70 denotes a pressure gauge, numeral 72 denotes a pressure-reducing valve, numeral 74 denotes a flow meter, numeral 76 denotes a flow rate control valve, numeral 78 denotes a pressurizing valve 78, and numeral 82 denotes a discharge ball valve 82 for opening and closing a lubricant path.

A pressurized air piping system in the lubricant supply apparatus 10 according to the embodiment is arranged as described below. That is, numeral 1a denotes a pressurized air supply system for regulating pressurized air introduced from the outside to a predetermined pressure by the pressure-reducing valve 72 and supplying it to the minute amount supply feeder 40 while controlling the amount thereof, and numeral 1b denotes a regulation/exhaust system for communicating the pressure in the lubricant storage vessel 30 with the pressure in the charge chute 34 that is connected to the lubricant storage vessel 30 through the screw feeder 32 so as to regulate the pressure. The regulation/exhaust system also acts as an exhaust system for exhausting the overall apparatus when it is stopped.

Further, numeral 1c denotes a bypass for connecting the pressurized air supply system 1a to the regulation/exhaust system 1b for smoothly exhausting the interior of the apparatus when it is stopped; and numeral 1d denotes a lubricant discharge (feed) system for forming a path of pressurized air containing the lubricant supplied from the minute amount supply feeder 40 to the table making machine 20. Note that air flow heat unit (heat pipe) 60 is disposed in the lubricant discharge system 1d as described above. Further, the speed controllers 64 and 66 are composed of throttle valves for regulating a pressure (atmospheric pressure) difference in the above respective piping systems.

Figure 2:
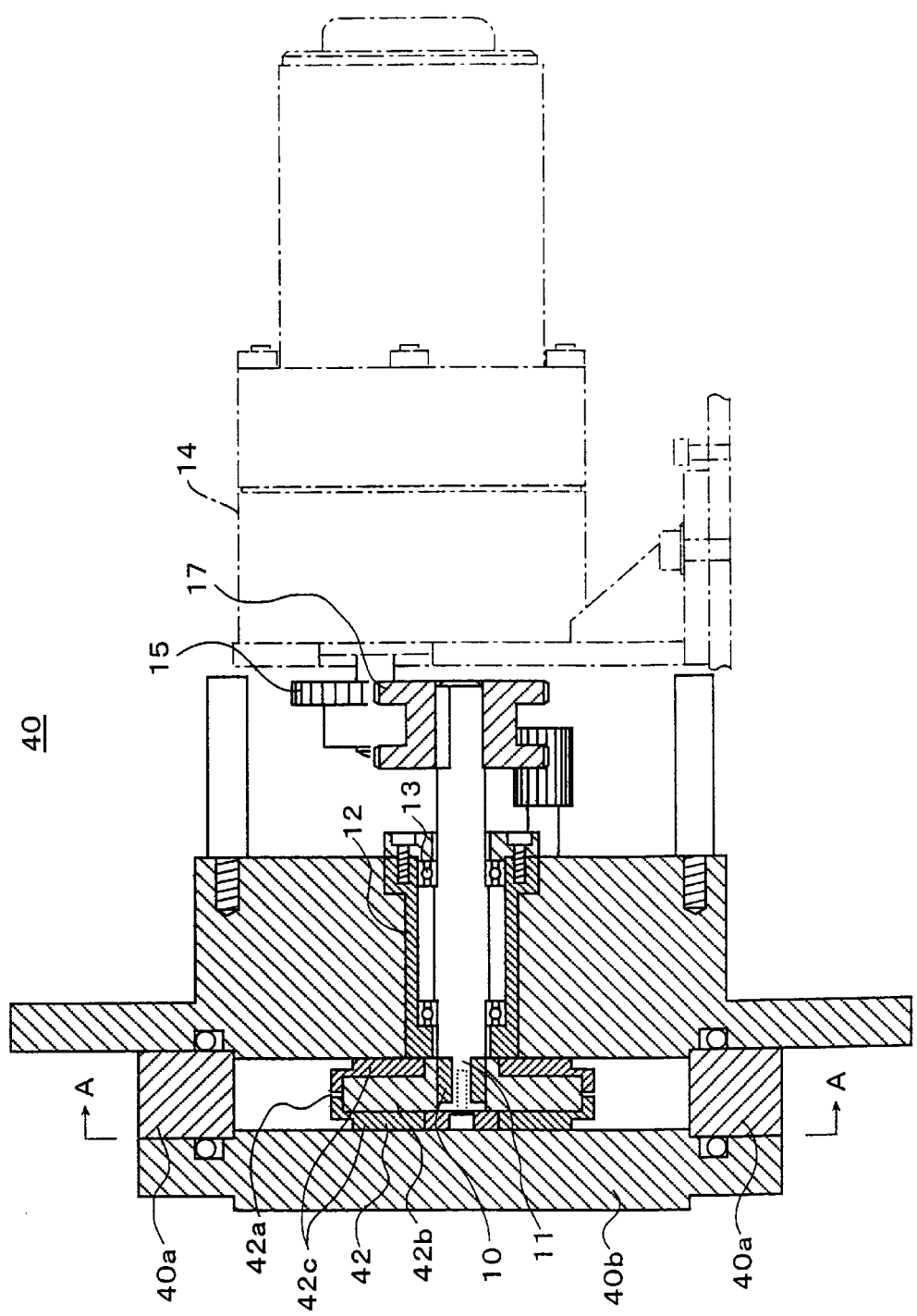
FIG. 2 is a view showing a detailed arrangement of a minute amount supply feeder shown in FIG. 1.
Figure 3:
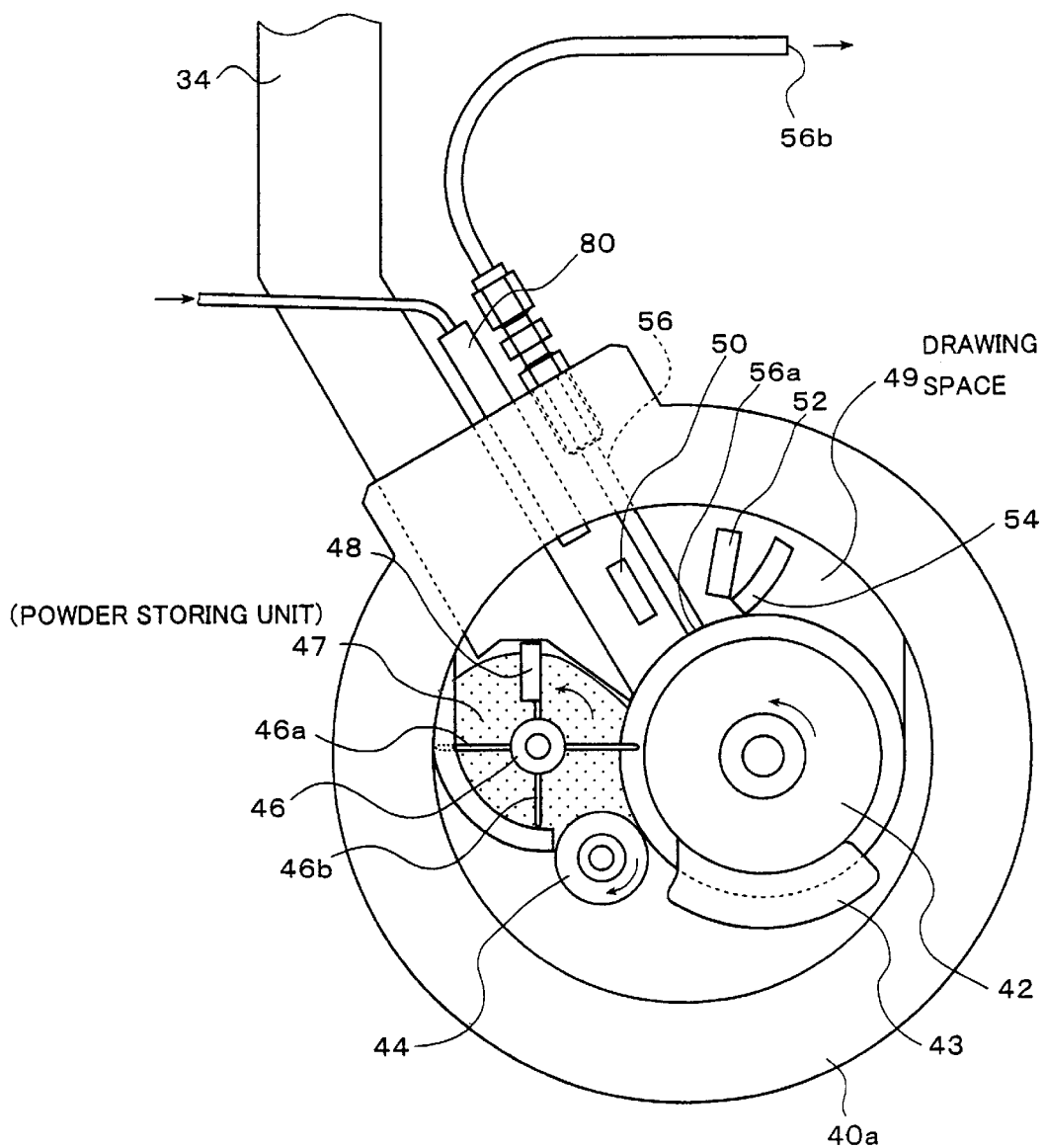
FIG. 3 is a sectional view taken along the line A—A of FIG. 2.

FIGS. 2 and 3 show a detailed arrangement of the above-mentioned minute amount supply feeder 40, wherein FIG. 2 shows a sectional view of the minute amount supply feeder 40; and FIG. 3 shows a sectional view taken along the line A—A of FIG. 2. As shown in FIGS. 2 and 3, the minute amount supply feeder 40 according to the embodiment includes a case body 40a which is secured on the front surface (on the left side in FIG. 2) of the main body thereof and serves as a vessel for accommodating the lubricant and a transparent cover 40b, which is detachably disposed on the front surface of the case body 40a and formed of a transparent glass or plastic so that the remaining amount of the lubricant stored in the case body 40a can be visually confirmed.

Further, the rotary supply body 42, the lubricant filling roll 44, the stirring unit 46, and the like are disposed in the case body 40a that is held between the main body of the minute amount supply feeder 40 and the transparent cover 40b. The rotary supply body 42 has the groove to be filled with lubricant (hereinafter, simply referred to as "groove") 42a which is filled with the lubricant and formed around the outer circumferential surface thereof; the lubricant filling roll 44 which charges the fine spherical lubricant into the groove 42a on the rotary supply body 42 under pressure; and the stirring unit 46 which stirs the lubricant stored in the case body 40a and uniformly supplies it between the rotary supply body 42 and the lubricant filling roll 44.

Further, as shown in FIG. 3, the rotary supply body 42 is disposed somewhat rightward at the center height of the case body 40a, and the lubricant filling roll 44 is disposed on the lower left side of the rotary supply body 42 to force (press) and fill the lubricant into the groove 42a on the rotary supply body 42. The rotary supply body 42 and the lubricant filling roll 44 are disposed such that the outer circumferences thereof are slightly spaced apart from each other and rotated in synchronism with each other to realize a function for forcibly charging the lubricant stored on the lubricant filling (force and fill) roll 44 into the groove 42a on the rotary supply body 42 in such a degree that the lubricant is not dropped therefrom.

Figure 4:
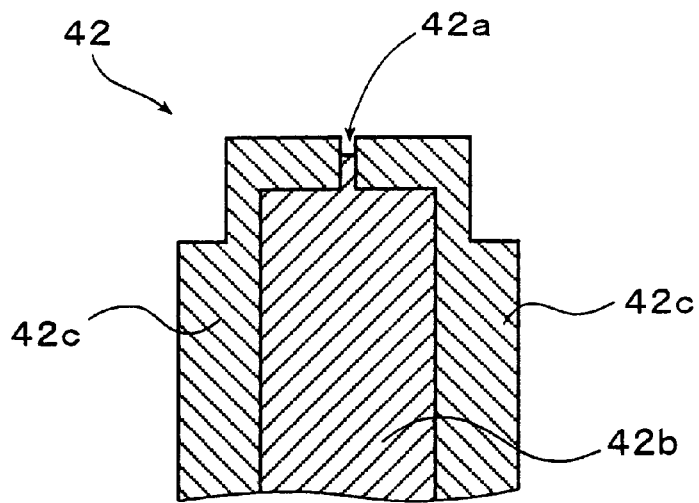
FIG. 4 is a view showing a detailed arrangement of a rotary supply body as a main portion of the minute amount supply feeder.

As shown in FIG. 4 in detail, the outer circumference of the rotary supply body 42 is arranged such that two externally fitting members 42c are fitted on both the sides of a central member 42b and a gap between the externally fitting members 42c formed at the center thereof is arranged as the groove 42a. Then, a stepped portion which is narrower than the width of the case body 40a is formed on the outer circumference of the externally fitting members 42c, and the stepped portion is provided with a function as an escaping section for escaping the lubricant that is held between the lubricant filling roll 44 and the outer circumference of the rotary supply body 42 when it is forcibly charged by the lubricant filling roll 44 and with a function for returning the lubricant scraped by the scraper 54, which will be described later, to a powder storing unit 47.

The lubricant filling roll 44 is disposed on the lower left side of the rotary supply body 42 at a position where the outer circumference thereof is slightly spaced apart from the outer circumference of the rotary supply body 42 in such a degree as not to break the lubricant held therebetween by pressed pressure. Then, the lubricant having flown into the groove 42a of the rotary supply body 42 is temporarily solidified therein by being pressed by the outer circumference of the lubricant filling roll 44 and forcibly charged into the groove 42a by the rotation of the rotary supply body 42, and the like so that it is not dropped therefrom. Note that it is effective to roughen the bottom surface and side walls of the groove 42a or to form them to a wave-shape so that it is difficult for the solidified lubricant from dropping from the groove 42a. Further, it is also possible to make the width of the lubricant filling roll 44 as large as or slightly smaller than that of the groove 42a of the rotary supply body 42 so that only the lubricant in the groove 42a of the rotary supply body 42 is pressed by the lubricant filling roll 44.

The width and depth of the groove 42a of the rotary supply body 42 can be appropriately changed as described below.

That is, as to the width of the groove 42a, a target width can be set in such a manner that several types of the central members 42b having variously changed widths of a projecting portion (corresponding to the width of the groove 42a) are prepared and appropriately combined with externally fitting members 42c corresponding to them in accordance with an amount of the lubricant to be supplied, and the like.

Further, as to the depth of the groove 42a, a target depth can be set by preparing several types of the central members 42b having variously changed heights of the projecting portion (corresponding to the height of the groove 42a).

Figure 5:
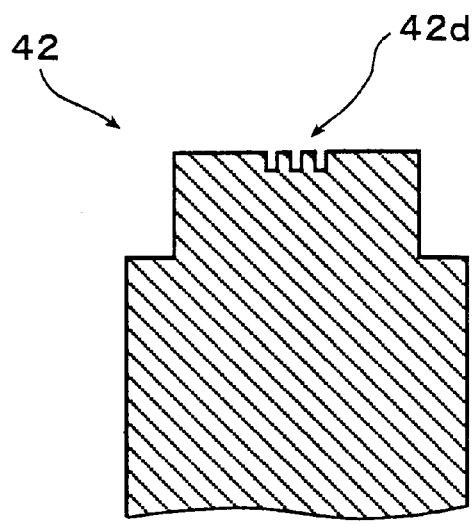
FIG. 5 is a view showing another arrangement of the rotary supply body as the main portion of the minute amount supply feeder.

It should be noted that a plurality of the grooves 42a may be formed on the rotary supply body 42 as denoted by numeral 42d in FIG. 5. The formation of the plurality of thin grooves permits the lubricant to be supplied reliably and stably when the amount of it to be supplied is increased as compared with a case in which one wide groove or one deep groove is used.

In this case, it is preferable to arrange the lubricant filling roll 44 as a single body having a width which entirely covers the plurality of grooves 42d from a view point of cost and structure.

When the plurality of thin grooves are used, the lubricant filled in the grooves by the lubricant filling roll 44 is fed to the next process by a system shown in FIG. 6.

Figure 6A:
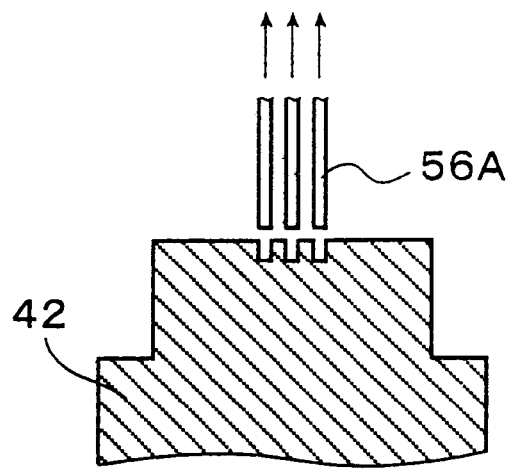
FIGS. 6A and 6B are views showing a lubricant discharge system for discharging a lubricant from the rotary supply body of the minute amount supply feeder.
Figure 6B:
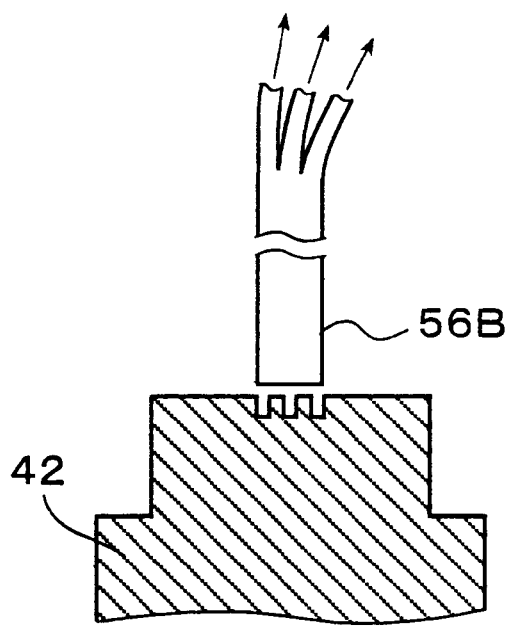

Note that FIG. 6A is a conceptual view of a case in which a plurality of lubricant supply pipes 56A, which correspond to the respective ones of the above-mentioned plurality of grooves 42d, are used, and FIG. 6B is a conceptual view of a case in which the a lubricant supply pipe 56B is used to draw the lubricant from the plurality of grooves 42d at a time and divides it at an outlet in accordance with the number of subsequent processes.

As described above, when the plurality of grooves are formed on the rotary supply body 42, the overall structure thereof may be arranged as an integral structure (refer to FIG. 5) different from the divided structure exemplified in FIG. 4. In the rotary supply body 42 arranged as the integral structure, when it is necessary to change the width and depth of the grooves 42d thereof, it must be entirely replaced with another one so as to be fitted to the changed width and depth. However, the employment of this structure has an effect of improving accuracy.

FIG. 7 shows a detailed shape of the stirring unit 46. As shown in the figure, the stirring unit 46 in this embodiment has rod-shaped blades 46a and 46b projecting in four directions. The rotation of the stirring unit 46 prevents the formation of bridges in the lubricant as well as permits the lubricant to be uniformly supplied between the rotary supply body 42 and the lubricant filling roll 44 at all times. The blades 46a and 46b of the stirring unit 46 have projections for stirring the accommodated portion of the lubricant as well as for scraping the lubricant to prevent it from being deposited on the escaping portions of the side surfaces of the rotary supply body 42 and being introduced into an upper drawing space. Further, the short blades 46b are arranged to stir only the accommodated portion of the lubricant.

These rotary supply body 42, lubricant filling roll 44 and stirring unit 46 are rotatably supported, respectively by rotating shafts that are journaled by bearing mechanisms passing through the main body of the minute amount supply feeder 40 and that are disposed passing through the main body of the minute amount supply feeder 40. These bearing mechanisms have substantially the same structure while they have a different shaft diameter. Thus, only the bearing mechanism for supporting the rotary supply body 42 will be described here, and the description of the bearing mechanisms of the lubricant filling roll 44 and the stirring unit 46 is omitted.

As an embodiment of the rotating shafts and the bearing mechanisms, a mechanism for supporting the rotary supply body 42 will be described here. As shown in FIG. 2, the rotary supply body 42 is coupled with a rotating shaft 11 through a key 10. The rotating shaft 11 is journaled by two ball bearings 13 disposed in a hollow bearing housing 12 disposed passing through the main body of the minute amount supply feeder 40 so as to rotate through the main body of the minute amount supply feeder 40. Then, a gear 15, which is disposed to a reducer-including motor 14 acting as a drive source, and a gear 17, which is coupled with gear trains (not shown) disposed to the respective rotating shafts of the lubricant filling roll 44 and the stirring unit 46, are fixed to the other end of the rotating shaft 11 passing through the main body of the minute amount supply feeder 40.

As described above, the rotary supply body 42, the lubricant filling roll 44 and the stirring unit 46 are journaled by the rotating shafts rotatably disposed passing through the main body of the minute amount supply feeder 40 and coupled with each other through the gear trains so that they are rotated by the reducer-including motor 14 as the single drive source in synchronism with each other. While not shown, a vibrating mechanism is disposed at the position of the gear of the rotating shaft of the stirring unit 46 to remove the lubricant deposited on the stirring unit 46 by applying impact thereto.

Description will be continued returning to FIG. 3.

As shown in FIG. 3, the case body 40a is formed in a shape that is machined along the outer circumferences of the rotary supply body 42, the lubricant filling roll 44 and the stirring unit 46 in an arc shape to eliminate the formation of an extra space which is located under the rotary supply body 42, the lubricant filling roll 44, and the stirring unit 46 and in which the lubricant is stored as a dead stock. In particular, at the position of the rotary supply body 42, plate-shaped spacer plates 43 that correspond to the escaping portions of the rotary supply body 42 are disposed on both the surfaces of the rotary supply body 42 to prevent the lubricant from flowing into the drawing space which will be described later.

In the vicinity of the stirring unit 46, the case body 40a is formed to have large arcs, which correspond to the long blades 46a of the stirring unit 46, on both the sides thereof and to have a small arc, which corresponds to the short blades 46b, at the center thereof so that the case body 40a corresponds to the long blades 46a and the short blades 46b of the stirring unit 46.

The powder storing unit 47 is formed in the portion where the above-mentioned stirring unit 46 is disposed to store the lubricant that is supplied from the lubricant storage vessel 30 through the screw feeder 32 and the charge chute 34. Further, the drawing space 49 for drawing up the lubricant charged forcibly into the groove 42a of the above-mentioned rotary supply body 42 is formed on a side opposite to the stirring unit 46.

The scraper 54 is disposed on the rotary supply body 42 to remove the lubricant deposited on the outer circumference of the rotary supply body 42. The scraper 54 is used to remove the lubricant deposited on the outer circumference of the rotary supply body 42 and preferably composed of a soft rubber or plastic. The removal of the lubricant deposited on the outer circumference of the rotary supply body 42 by the scraper 54 permits only the lubricant charged forcibly into the groove 42a to remain.

The above-mentioned lubricant charged forcibly into the groove 42a of the rotary supply body 42 is discharged to the outside by the lubricant supply pipe 56 disposed at a position facing the groove 42a of the rotary supply body 42 in the vicinity thereof. That is, when the pressure inside of the hermetically sealed rotary supply body 42 is relatively increased by air supplied thereto from an air introduction port 80, an air flow is formed in the rotary supply body 42 by a pressure difference between the outside and the inside of the rotary supply body 42 because only the other end 56b of the lubricant supply pipe 56 communicates with the outside. Thus, the air inside of the rotary supply body 42 flows to the outside through the lubricant supply pipe 56.

Since the opening 56a of the lubricant supply pipe 56 is disposed at a position facing the groove 42a of the rotary supply body 42 in the vicinity thereof, the lubricant, which has been charged forcibly into the groove 42a of the rotary supply body 42, is removed therefrom by an air blow drawn from the opening 56a into the lubricant supply pipe 56 and drawn into the lubricant supply pipe 56, heated through the discharge ball valve 82 and the heat pipe 60, and discharged and fed to the table making machine 20 from the other end 56b of the lubricant supply pipe 56.

As described above, after the lubricant is charged forcibly into the groove 42a of the rotary supply body 42 by the lubricant filling roll 44, the action of the lubricant that it is reliably drawn into the lubricant supply pipe 56 by the air flow drawn into the lubricant supply pipe 56 without being removed from inside of the groove 42a when the rotary supply body 42 is rotated can be achieved by controlling the width and depth of the groove 42a based on the material, particle size and shape of the lubricant and by roughing the bottom and side walls of the groove 42a or by forming them to the wave shape as described above. Further, the amount per unit time of the lubricant discharged and fed from the lubricant supply pipe 56 can be controlled by the sectional area of the groove 42a of the rotary supply body 42 and by the rotational speed of the rotary supply body 42.

Further, an air flow source for generating the air flow is obtained from dehumidified air supplied from the air introduction port 80 shown in FIGS. 1 and 3. The gas supplied from the air introduction port 80 is not limited to the dehumidified air, and any inert gas such as a nitrogen gas may be used when necessary. Otherwise, the lubricant may be drawn out from the lubricant supply pipe 56 by providing a pressure difference between the inside and the outside of the lubricant supply pipe 56 by reducing the pressure in the lubricant supply pipe 56 on the other end 56b side thereof.

A lubricant supply system in the lubricant supply apparatus 10 according to the embodiment of the present invention is arranged as described below. That is, the apparatus is arranged by adding a lubricant replenishing unit (the lubricant supply system composed of the lubricant storage vessel 30, the charge chute 34 and the screw feeder 32 for connecting them) to an apparatus employing the rotary supply body 42 which is originally intended to be used in a batch type operation for handling a relatively small amount of the lubricant so that the apparatus can be modified to withstand a continuous operation of a long time. Further, the apparatus also is provided with a lubricant amount sensor 48 for determining timing at which the lubricant is to be replenished to perform replenishment automatically.

In the lubricant supply apparatus 10 shown in the embodiment, it is a principle to fill a lubricant accommodating unit in the case body 40a of the minute amount supply feeder 40 with the necessary amount of the lubricant before the apparatus starts operation. When the remaining amount of the lubricant is reduced, however, the lubricant is appropriately replenished to the lubricant storage vessel 30 because the amount of the lubricant in the case body 40a can be visually confirmed through the transparent cover 40b. Note that it is preferable to automatically perform the replenishing operation by monitoring the remaining amount of the lubricant in the case body 40a by the optical sensor 48.

Further, the lubricant supply apparatus 10 shown in the embodiment always monitors whether or not the lubricant is present in the groove 42a of the rotary supply body 42 by the optical sensors before or after the lubricant is drawn into the lubricant supply pipe 56 from the opening 56a thereof so that the lubricant is reliably supplied to the table making machine 20. This monitor operation is carried out also to check the amount of the lubricant supplied. Numerals 50 and 52 in FIGS. 1 and 3 denote the optical sensors for this purpose, wherein the sensor 50 is located behind the lubricant supply pipe 56 and the sensor 52 is located in front of it.

That is, when the lubricant supply apparatus 10 of the embodiment is normally operated, the lubricant in the groove 42a of the rotary supply body 42 is sensed by the sensor 52 in front of the lubricant supply pipe 56. However, the lubricant in the groove 42a of the rotary supply body 42 is not sensed by the sensor 50 behind the lubricant supply pipe 56. When the lubricant is sensed by a sensing mode other than the above, it is determined that an abnormal state is caused to the lubricant supplying apparatus 10. Thus, an alarm must be issued or the lubricant supply apparatus 10 must be stopped temporarily.

That is, while the lubricant is supplied to the table making machine 20, it is sequentially charged forcibly into the groove 42a of the rotary supply body 42 and discharged and fed to the table making machine 20 through the lubricant supply pipe 56 on the side of the minute amount supply feeder 40. Further, the process in which the lubricant is discharged and fed is monitored by the optical sensor 48 (sensor for checking the amount of the lubricant in the lubricant accommodating unit), the optical sensors 50 and 52 (sensors for checking the lubricant charged forcibly into the groove 42a of the rotary supply body 42 and the lubricant taken out therefrom), and if the abnormal state is sensed, the alarm or the like is issued.

Further, the lubricant supply apparatus 10 according to the embodiment is very excellent in a constant quantity property and stability as described later. Thus, it is substantially not necessary to check the amount of the lubricant which is supplied while the lubricant supply apparatus 10 is operated when the amount is previously set based on a value previously measured actually. However, the flow rate of the supplied fine powder may be displayed and recorded when necessary by calculating the rate of change per unit time of the weight of the overall lubricant supply apparatus 10 by placing the overall lubricant supply apparatus 10 on a weigher and measuring the weight of the apparatus in each minute time.

While the lubricant is discharged and fed from the minute amount supply feeder 40 based on the difference of pressures (atmospheric pressures) between both the ends of the lubricant supply pipe 56 in the above embodiment, the lubricant may be unexpectedly moved in the system having the pressure difference (atmospheric pressure difference) unless the pressure difference (atmospheric pressure difference) is appropriately removed when, for example, the apparatus 10 is stopped. To prevent the occurrence of the above circumstance, the lubricant supply apparatus 10 shown in the embodiment includes the valves 78, 82, and 62 which are disposed in a high pressure supply path to the minute amount supply feeder 40, to a lubricant supply path to the table making machine 20 and to respective pressurizing paths to the space in the upper portion of the lubricant storage vessel 30, respectively.

These valves 78, 82 and 62 are opened and closed in the following sequence. That is, as shown in FIG. 8A, when the apparatus is started:

(1) the ball valve 82 in the lubricant supply path of the lubricant to the table making machine 20 is opened; and (2) the stop valve 78 in the high pressure air supply path to the minute amount supply feeder 40 is opened.

With these operations, pressure is increased in the sequence of (A), (B), and (C). The relationship of (pressure of the air introducing portion in the minute amount supply feeder 40) (A) (refer to FIG. 1)>(pressure of the lubricant accommodating unit in the minute amount supply feeder 40) (B) (ditto)>(pressure of the upper space in the lubricant storage vessel 30) (C) (ditto) is maintained until a steady state is achieved.

Further, as shown in FIG. 8B, when the apparatus stops:

(1) the ball valve 82 in the lubricant supply path of the lubricant to the table making machine 20 is closed, and at this stage, (pressure of the air introducing portion in the minute amount supply feeder 40) (A) increases and is made larger than (pressure of the lubricant accommodating unit in the minute amount supply feeder 40) (B);

(2) the stop valve 78 in the high pressure air supply path to the minute amount supply feeder 40 is closed, and at this stage, the above three pressures are made approximately equal to each other (however, (A)≧(B)≧(C));

(3) next, the exhaust valve 62 in the upper space of the lubricant storage vessel 30 is opened, in this stage, air is discharged only from the path having the valve 62 and the flow rate of air is reduced by the speed controller 66, which establishes the relationship of (pressure of the air introducing portion in the minute amount supply feeder 40) (A)> (pressure of the upper space in the lubricant storage vessel 30) (C); and the lubricant accommodating unit in the minute amount supply feeder 40 is physically formed between the air introducing portion in the minute amount supply feeder 40) and the lubricant storage vessel 30, which results in the relationship of (pressure of the air introducing portion in the minute amount supply feeder 40) (A)>(pressure of the lubricant accommodating unit in the minute amount supply feeder 40) (B)>(pressure of the upper space in the lubricant storage vessel 30) (C); and (4) air is discharged from the valve 62 so as to lower an overall pressure, and then the valve 62 is closed after (pressure of the air introducing portion in the minute amount supply feeder 40) (A) is sufficiently reduced.

With the above processing of air, the relationship of (pressure of the air introducing portion in the minute amount supply feeder 40) (A)>(pressure of the lubricant accommodating unit in the minute amount supply feeder 40) (B) is maintained. As a result, no air flow is caused from the lubricant accommodating unit in the minute amount supply feeder 40 into the air introducing portion, and thus so called flushing does not arise.

How precisely the lubricant is supplied by the lubricant supply apparatus 10 according to the embodiment will be described below. Note that, in the measurement, the lubricant supply pipe from the lubricant supply apparatus 10 was connected to a sampling vessel 94, which was set on a weigher (electronic weigher) 90 and had a dehumidifying filter 92 as shown in FIG. 9, the lubricant supplied was collected into the sampling vessel 94, and the amount of the lubricant supplied per unit time and the integral amount of the supplied lubricant were measured by the weigher 90.

The operating conditions of the lubricant supply apparatus 10 were set as shown in Table 1 and the amount of the supplied lubricant was measured under four types of the conditions (note that Table 1 also shows resultant numerals). Further, FIGS. 10 and 11 show a part of the results (two types).

TABLE 1

| | Operating Conditions | | | Result | |
|---|---|---|---|---|---|
| No. | Number of Revolution (rpm) | Amount of Air (NL/min) | Internal Pressure (kPa) | Average Flow Rate (g/h) | Standard Deviation (g/h) |
| 1 | 2 | 6 | 53.9 | 10.8 | 0.98 |
| 2 | 3 | 6 | 29.4 | 17.9 | 0.49 |
| 3 | 4 | 6 | 29.4 | 23.9 | 0.81 |
| 4 | 7 | 6 | 53.9 | 39.9 | 1.08 |

Figure 10:
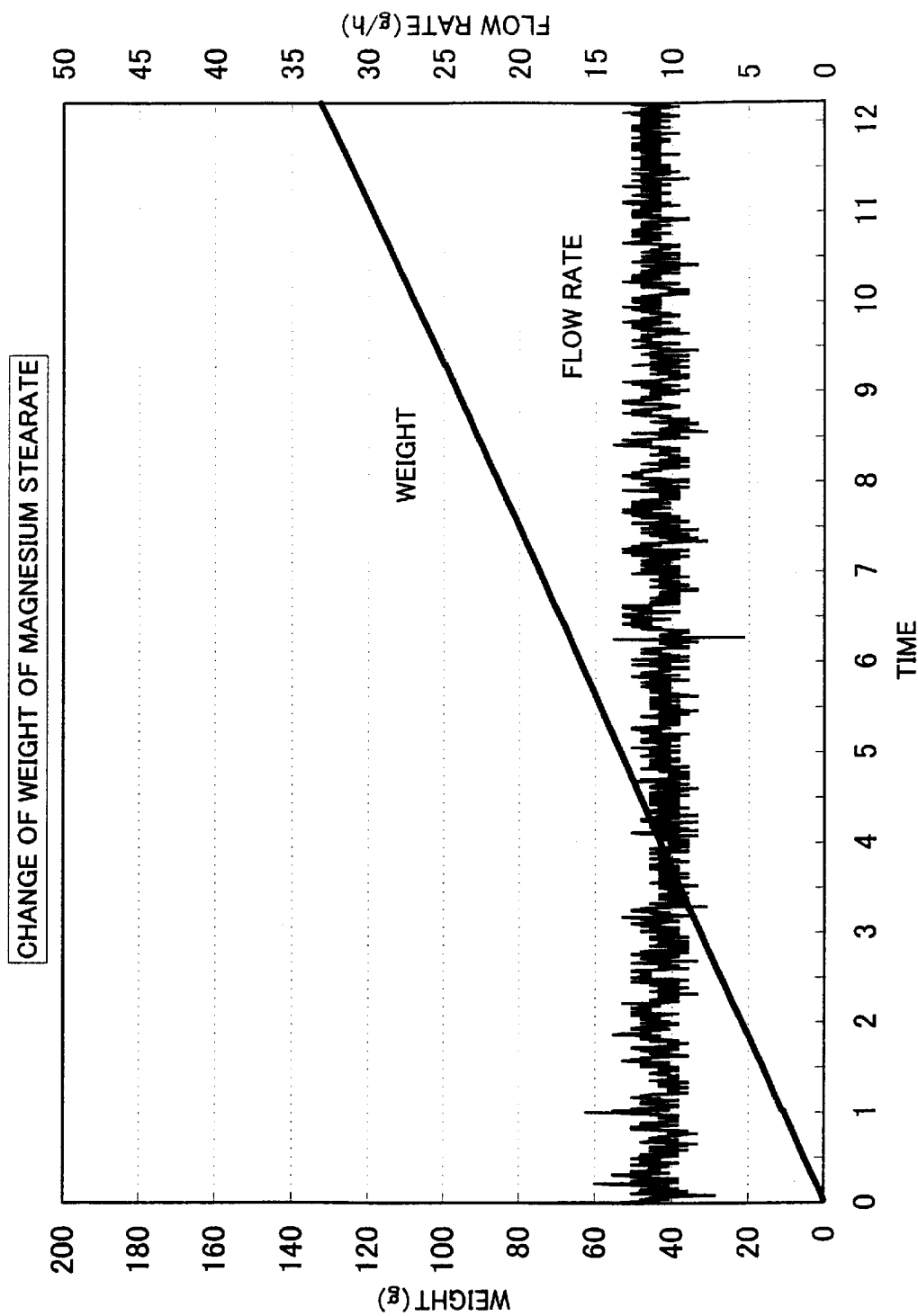
FIG. 10 is an example (No. 1) of a graph showing a result of measurement of the supply accuracy of the lubricant measured by the measuring device shown in FIG.
Figure 11:
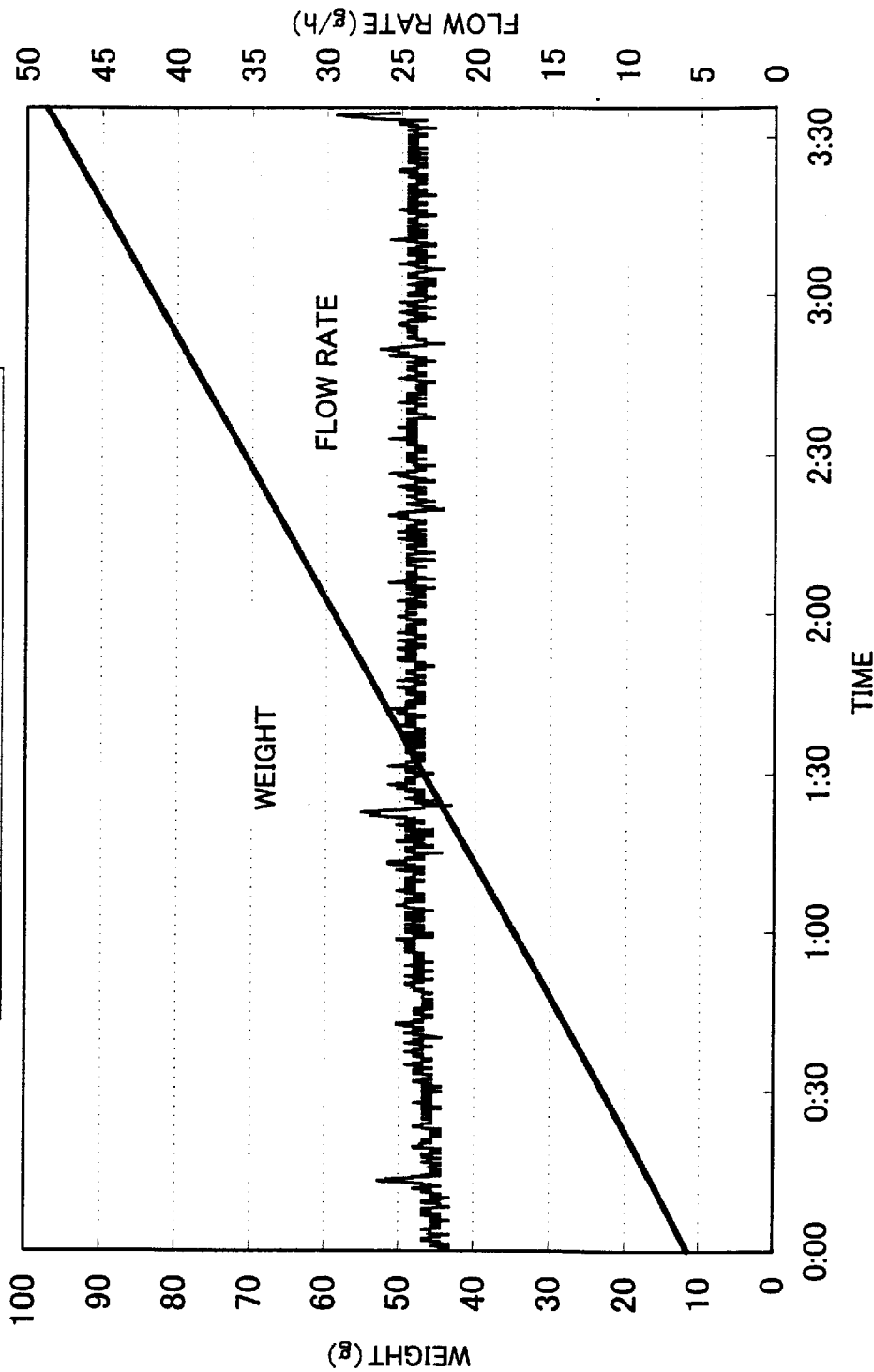
FIG. 11 is an example (No. 2) of a graph showing a result of measurement of the supply accuracy of the lubricant measured by the measuring device shown in FIG.

As apparent from FIGS. 10 and 11, the lubricant supply apparatus 10 according to the embodiment has a very excellent capability of supplying the lubricant in an ultra minute amount. Moreover, the lubricant supply apparatus 10 is very excellent in that it can continuously perform the lubricant supply operation for a long period of time.

According to the lubricant supply apparatus 10 of the embodiment, an effect of supplying the lubricant to the tablet making machine 20 stably in the dispersed state in an ultra minute amount with pinpoint accuracy can be obtained. Moreover, since the minute amount supply feeder 40 for realizing the dispersing supply has a simple structure, the minute amount supply feeder 40 has an advantage that the maintenance thereof can be easily carried out and that is can be easily handled. Furthermore, the provision of the heat mechanism can prevent sticking of the lubricant caused by local condensation which may occur when the lubricant is supplied to the tablet making machine which is cool when it starts operation.

It should be noted that it is needless to say that the above embodiment shows only an embodiment of the present invention and the present invention is by no means limited thereto. For example, the precise fine powder dispersing supply apparatus of the present invention can be widely applied when arbitrary "fine powder having strong adhesion properties" other than the lubricant is precisely supplied in a dispersed state.

Further, it is also possible to supply fine powder to a plurality of fine powder receiving units at the same time by forming a plurality of the grooves 42a on the rotary supply body 42 of the lubricant supply apparatus 10

As described above in detail, according to the present invention, an effect of realizing the precision fine powder dispersing supply apparatus capable of stably supplying fine powder in an ultra minute amount with pinpoint amount can be obtained.

In particular, the minute amount supply feeder according to an aspect of the present invention exhibits an outstanding effect of stably supplying fine powder with pinpoint accuracy.

According to the other aspect of the present invention provided with the fine powder sensing device, the reliability of the apparatus can be greatly improved in the supply of the fine powder.

According to the other aspect of the present invention, the unexpected movement of the fine powder in the system, which is caused when the apparatus is started and stopped, can be perfectly prevented, which ensures the stable operation of the apparatus.

According to the other aspect of the present invention, there can be provided the precision fine powder dispersing supply apparatus capable of stably supplying the fine powder while perfectly preventing the local condensation which may be caused in the subsequent process.

Further, according to the other aspect of the present invention, the precision fine powder dispersing supply apparatus can be used as the lubricant supply apparatus for supplying the lubricant to a plurality of the tablet making machines.

What is claimed is:

1. A precision fine powder dispersing supply apparatus for supplying fine powder to a subsequent process in a dispersed state comprising:
    a fine powder storage vessel;
    a minute amount supply feeder;
    a supply device for supplying fine powder in said storage vessel to said minute amount supply feeder;
    a discharging device for discharging said fine powder from said minute amount supply feeder to said subsequent process; and
    a heat device is disposed in a transportation path of said fine powder from said fine powder supply feeder to said subsequent process, wherein
    said minute amount supply feeder comprises:
        a rotary body having at least one circumferential groove which is filled with the fine powder and formed on an outer circumferential surface;
        at least one thin pipe disposed so that the opening thereof faces said at least one circumferential groove with a predetermined interval defined therebetween;
        at least one filling device for forcing and filling said fine powder into said at least one circumferential groove of said rotary body;
        a pressure difference generating device for generating a pressure difference for causing an air flow from a space in which said rotary body is disposed into said at least one thin pipe so that the fine powder that is forced into and filled in said at least one circumferential groove of said rotary body is discharged together with air; and
        a fine powder presence sensing device disposed in front of and behind said at least one thin pipe to confirm whether or not the fine powder that is forced into and filled in said am least one circumferential groove of said rotary body exists therein and whether or not the fine powder is discharged therefrom.

2. The precision fine powder dispersing supply apparatus according to claim 1, wherein said pressure difference generating device is a pressurizing device for pressurizing the space in which said rotary body is disposed.

3. The precision fine powder dispersing supply apparatus according to claim 2, wherein valves are disposed to respective ones of an exhaust path from an upper space of said storage vessel, a pressurized air supply path of said pressurizing device and the fine powder discharge path of said fine powder supply feeder as well as a control device is provided to open and close said valves when said apparatus is started and stopped.

4. The precision fine powder dispersing supply apparatus according to claim 1, wherein at least said minute amount supply feeder is placed on a weigher so that a flow rate of said supplied fine powder can be continuously measured.

5. The precision fine powder dispersing supply apparatus according to claim 1, wherein a plurality of circumferential grooves for filling said fine powder are formed as said at least one circumferential groove on the outer circumferential surface of said rotary body as well as a plurality of filling devices for forcing and filling said fine powder into said plurality of circumferential grooves and plurality of thin pipes having openings that face said plurality of circumferential grooves with a predetermined interval defined therebetween are disposed as said at least one filling device and said at least one thin pipe in correspondence to said plurality of circumferential grooves and a plurality of outlets of said plurality of thin pipes are disposed so as to correspond to a plurality of said subsequent processes.

6. A precision fine powder dispersing supply apparatus for supplying fine powder to a subsequent process in a dispersed state comprising:
    a fine powder storage vessel;
    a minute amount supply feeder;
    a supply device for supplying fine powder in said storage vessel to said minute amount supply feeder; and
    a discharging device for discharging said fine powder from said minute amount supply feeder to said subsequent process, wherein
    said minute amount supply feeder comprises:
        a rotary body having at least one circumferential groove which is filled with the fine powder and formed on an outer circumferential surface;
        at least one thin pipe disposed over the outer circumferential surface of said rotary body so that an opening thereof faces said at least one circumferential groove with a predetermined interval defined therebetween;

at least one filling device for forcing and filling said fine powder into said at least one circumferential groove of said rotary body from an outside thereof; and a pressure difference generating device for generating a pressure difference for causing an air flow from a space in which said rotary body is disposed into said at least one thin pipe so that the fine powder that is forced into and filled in said at least one circumferential groove of said rotary body is discharged together with air into said at least one thin pipe from said at least one circumferential groove.

7. The precision fine powder dispersing supply apparatus according to claim 6, wherein said pressure difference generating device is a pressurizing device for pressurizing the space in which said rotary body is disposed.

8. The precision fine powder dispersing supply apparatus according to claim 7, wherein valves are disposed to respective ones of an exhaust path from an upper space of said storage vessel, a pressurized air supply path of said pressurizing device and the fine powder discharge path of said fine powder supply feeder as well as a control device is provided to open and close said valves when said apparatus is started and stopped.

9. The precision fine powder dispersing supply apparatus according to claim 6, wherein said minute amount supply feeder includes fine powder presence sensing device disposed in front of and behind said at least one thin pipe to confirm whether or not the fine powder that is forced into and filled in said at least one circumferential groove of said rotary body exists therein and whether or not the fine powder is discharged therefrom.

10. The precision fine powder dispersing supply apparatus according to claim 6, wherein a heat device is disposed in a transportation path of said fine powder from said fine powder supply feeder to said subsequent process.

11. The precision fine powder dispersing supply apparatus according to claim 6, wherein at least said minute amount supply feeder is placed on a weigher so that a flow rate of said supplied fine powder can be continuously measured.

12. The precision fine powder dispersing supply apparatus according to claim 6, wherein a plurality of circumferential grooves for filling said fine powder are formed as said at least one circumferential groove on the outer circumferential surface of said rotary body as well as a plurality of filling devices for forcing and filling said fine powder into said plurality of circumferential grooves and plurality of thin pipes having openings that face said plurality of circumferential grooves with a predetermined interval defined therebetween are disposed as said at least one filling device and said at least one thin pipe in correspondence to said plurality of circumferential grooves and a plurality of outlets of said plurality of thin pipes are disposed so as to correspond to a plurality of said subsequent processes.

13. A precision fine powder dispersing supply apparatus for supplying fine powder to a subsequent process in a dispersed state comprising:

a fine powder storage vessel;

a minute amount supply feeder;

a supply device for supplying fine powder in said storage vessel to said minute amount supply feeder;

a discharging device for discharging said fine powder from said minute amount supply feeder to said subsequent process; and a heat device is disposed in a transportation path of said fine powder from said fine powder supply feeder to said subsequent process, wherein said minute amount supply feeder comprises:

a rotary body having at least one circumferential groove which is filled with the fine powder and formed on an outer circumferential surface;

at least one thin pipe disposed so that the opening thereof faces said at least one circumferential groove with a predetermined interval defined therebetween;

at least one filling device for forcing and filling said fine powder Into said at least one circumferential groove of said rotary body; and a pressure difference generating device for generating a pressure difference for causing an air flow from a space in which said rotary body is disposed into said at least one thin pipe so that the fine powder that is forced into and filled in said at least one circumferential groove of said rotary body is discharged together with air, and wherein a plurality of circumferential grooves for filling said fine powder are formed as said at least one circumferential groove on the outer circumferential surface of said rotary body as well as a plurality of filling devices for forcing and filling said fine powder into said plurality of circumferential grooves and plurality of thin pipes having openings that face said plurality of circumferential grooves with a predetermined interval defined therebetween are disposed as said at least one filling device and said at least one thin pipe in correspondence to said plurality of circumferential grooves and a plurality of outlets of said plurality of thin pipes are disposed so as to correspond to a plurality of said subsequent processes.

14. The precision fine powder dispersing supply apparatus according to claim 13, wherein said pressure difference generating device is a pressurizing device for pressurizing the space in which said rotary body is disposed.

15. The precision fine powder dispersing supply apparatus according to claim 13, wherein said minute amount supply feeder includes fine powder presence sensing device disposed in front of and behind said at least one thin pipe to confirm whether or not the fine powder that is forced into and filled in said at least one circumferential groove of said rotary body exists therein and whether or not the fine powder is discharged therefrom.

16. The precision fine powder dispersing supply apparatus according to claim 14, wherein valves are disposed to respective ones of an exhaust path from an upper space of said storage vessel, a pressurized air supply path of said pressurizing device and the fine powder discharge path of said fine powder supply feeder as well as a control device is provided to open and close said valves when said apparatus is started and stopped.

17. The precision fine powder dispersing supply apparatus according to claim 13, wherein at least said minute amount supply feeder is placed on a weigher so that a flow rate of said supplied fine powder can be continuously measured.

* * * * *

UNITED STATES PATENT AND TRADEMARK OFFICE
CERTIFICATE OF CORRECTION

PATENT NO. : 6,585,010 B2
DATED : July 1, 2003
INVENTOR(S) : Kiyoshi Takahashi et al.

It is certified that error appears in the above-identified patent and that said Letters Patent is hereby corrected as shown below:

Column 11,
Line 61, change "a heat device is disposed in a transportation path of said" to -- a heat device disposed in a transportation path of said --.

Column 12,
Line 44, change "plurality of circumferential grooves and plurality of thin" to
-- plurality of circumferential grooves and a plurality of thin --.

Column 14,
Line 4, change "a heat device is disposed in a transportation path of said" to -- a heat device disposed in a transportation path of said --.
Line 16, change "fine powder Into said at least one circumferential" to -- fine powder into said at least one circumferential --.
Line 31, change "circumferential grooves and plurality of thin" to -- circumferential grooves and a plurality of thin --.

Signed and Sealed this

Twenty-eighth Day of October, 2003

JAMES E. ROGAN
*Director of the United States Patent and Trademark Office*